(12) United States Patent
Ahn et al.

(10) Patent No.: US 11,440,802 B2
(45) Date of Patent: Sep. 13, 2022

(54) ELECTRODE ACTIVE MATERIAL, METHOD FOR MANUFACTURING SAME, AND LITHIUM SECONDARY BATTERY COMPRISING SAME

(71) Applicant: FOUNDATION FOR RESEARCH AND BUSINESS, SEOUL NATIONAL UNIVERSITY OF SCIENCE AND TECHNOLOGY, Nowon-gu Seoul (KR)

(72) Inventors: Hyo Jin Ahn, Nowon-gu Seoul (KR); Do Young Lee, Guri-si (KR); Geon Hyoung An, Nowon-gu Seoul (KR)

(73) Assignee: FOUNDATION FOR RESEARCH AND BUSINESS SEOUL NATIONAL UNIVERSITY OF SCIENCE AND TECHNOLOGY, Nowon-gu Seoul (KR)

( * ) Notice: Subject to any disclaimer, the term of this patent is extended or adjusted under 35 U.S.C. 154(b) by 361 days.

(21) Appl. No.: 16/613,795

(22) PCT Filed: May 18, 2017

(86) PCT No.: PCT/KR2017/005155
§ 371 (c)(1),
(2) Date: Nov. 14, 2019

(87) PCT Pub. No.: WO2018/212374
PCT Pub. Date: Nov. 22, 2018

(65) Prior Publication Data
US 2021/0147241 A1  May 20, 2021

(30) Foreign Application Priority Data

May 17, 2017 (KR) .................. 10-2017-0060939

(51) Int. Cl.
*C01B 32/90* (2017.01)
*B01D 9/00* (2006.01)
*H01M 10/0525* (2010.01)

(52) U.S. Cl.
CPC ............ *C01B 32/90* (2017.08); *B01D 9/0031* (2013.01); *H01M 10/0525* (2013.01);
(Continued)

(58) Field of Classification Search
None
See application file for complete search history.

(56) References Cited

U.S. PATENT DOCUMENTS

2004/0053136 A1  3/2004  Bauman

FOREIGN PATENT DOCUMENTS

| JP | H08231273 | 9/1996 |
| JP | 2000178017 | 6/2000 |

(Continued)

OTHER PUBLICATIONS

Lee et al. "High-surface-area tofu based activated porous carbon for electrical double-layer capacitors", 2017, J. Ind. Eng. Chem., 52, 121-127 (Year: 2017).*

(Continued)

*Primary Examiner* — Daniel S Gatewood
(74) *Attorney, Agent, or Firm* — JCIPRNET (57) ABSTRACT

The present invention relates to an electrode active material, a method for manufacturing the same, and a lithium secondary battery comprising the same. A method for producing carbide using bean curd or waste bean curd according to an embodiment of the present invention comprises the steps of: drying bean curd or waste bean curd; thermally treating the dried bean curd or waste bean curd under an air atmosphere; and carbonizing the thermally treated bean curd or waste bean curd under an inert gas atmosphere.

14 Claims, 5 Drawing Sheets

(52) U.S. Cl.
CPC .. *B01D 2009/0086* (2013.01); *C01P 2002/74* (2013.01); *C01P 2004/03* (2013.01); *C01P 2006/12* (2013.01); *C01P 2006/16* (2013.01)

(56) References Cited

FOREIGN PATENT DOCUMENTS

| | | |
|---|---|---|
| JP | 5886875 B2 * | 3/2016 |
| KR | 20000019114 | 4/2000 |
| KR | 20080101416 | 11/2008 |
| KR | 20120078645 | 7/2012 |
| KR | 20140017496 | 2/2014 |
| WO | 2012091515 | 7/2012 |

OTHER PUBLICATIONS

Do-Young Lee et al.,"High-surface-area tofu based activated porous carbon for electrical double-layer capacitors," Journal of Industrial and Engineering Chemistry,vol. 52, Mar. 27, 2017, pp. 121-127.
"International Search Report (Form PCT/ISA/210)" of PCT/KR2017/005155, dated Oct. 5, 2018 with English translation thereof, pp. 1-4.

* cited by examiner

ELECTRODE ACTIVE MATERIAL, METHOD FOR MANUFACTURING SAME, AND LITHIUM SECONDARY BATTERY COMPRISING SAME

TECHNICAL FIELD

The present invention relates to an electrode active material, a method for manufacturing the same, and a lithium secondary battery comprising the same.

BACKGROUND ART

In the midst of rising interest and demand in an eco-friendly green car, lithium secondary batteries have recently been in the limelight as power sources for electric motor-driven electric vehicles. In addition, availabilities of the lithium secondary batteries have been getting wider even in a small electronic device field by technological developments in electronic devices including a smartphone, a tablet PC, an ultra-book, etc. Higher performance has been required compared to existing lithium secondary batteries as a use field of the lithium secondary batteries is getting wider, and consumer demand becomes various. Currently, most of anode active materials for the lithium secondary batteries are formed of graphite-based active materials, and the price competitiveness has become important even in materials for the batteries as price competitiveness of batteries becomes a commercially important factor according to an enlargement trend of battery sizes. Accordingly, the anode active materials have a trend that a proportion of carbon-based active materials having price competitiveness in the graphite-based active materials is gradually being increased. However, due to factors including wide interlayer spacing and specific surface area of natural graphite compared to artificial graphite, crystal structural defects of the natural graphite, scaly particle shapes of the natural graphite, etc., output performance of natural graphite is remarkably lowered since, when natural graphite is used as an active material for batteries, the natural graphite has a severe side reaction with an electrolyte or increases graphite crystal orientation in an electrode.

Activated carbon is material which is mainly applied to environmental purification, energy storage and others due to its unique pore characteristics. Research of such existing activated carbon has been concentrated on a precursor and an activation process only. However, the activation process which produces pores by oxidizing graphite crystal grains requires a research on a carbonization process as well as the precursor which have an effect on crystallizability of activated carbon. Activated carbon is manufactured by cyclopedic raw materials such as plant-based raw materials (wood substance, palm nut shell), coal/petroleum pitch-based raw materials, polymer-based raw materials, bio-mass, etc., depending on starting materials, and any materials can be used as raw materials for activated carbon if carbon is contained in the starting materials. However, manufacturing of activated carbon which is more inexpensive, and of which specific surface area and pore structure are effectively controlled is at a very important position from an industrial point of view.

Meanwhile, since bean curd (tofu) has a very short shelf life, a large amount of bean curd (tofu) exceeding the shelf life is discarded. Therefore, there are problems including environmental contamination, generation of disposal costs, etc.

DISCLOSURE OF INVENTION

Technical Subject

The present invention has been made to resolve the above-mentioned problems, and an object of the present invention is to provide an electrode active material which resources food waste by using the bean curd (tofu) or waste bean curd (tofu), as raw material, discarded in a large amount due to its short shelf life and which implements excellent pore characteristics and electrochemical characteristics by controlling crystallizability, a method for manufacturing the electrode active material, and a lithium secondary battery comprising the electrode active material.

However, objects to be solved by the present invention are not limited to the above-mentioned object, and other objects that are not mentioned may be clearly understood by those skilled in the art in the following description.

Technical Solution

According to an embodiment of the present invention, a method for manufacturing a carbide using bean curd (tofu) or waste bean curd (tofu) is provided, wherein the method comprises: drying bean curd (tofu) or waste bean curd (tofu); thermally treating the dried bean curd (tofu) or waste bean curd (tofu) under an air atmosphere; and carbonizing the thermally treated bean curd (tofu) or waste bean curd (tofu) under an inert gas atmosphere.

According to an aspect, the drying process may be performed at a temperature of 40° C. to 200° C. for 24 hours to 100 hours.

According to an aspect, the drying process may be performed in at least any one dryer selected from the group consisting of a hot air dryer, a flash dryer, a cake dryer, and a ring dryer.

According to an aspect, the thermal-treatment process may be performed at a temperature of 200° C. to 500° C. for 30 minutes to 10 hours.

According to an aspect, the carbonization process may be performed at a temperature of 500° C. to 900° C. for 30 minutes to 3 hours.

According to an aspect, the method may further comprise crystallizing the carbonized bean curd (tofu) or waste bean curd (tofu) under an inert gas atmosphere after the performing of the carbonization process.

According to an aspect, the crystallization process may be performed at a temperature of 1,000° C. to 1,500° C. for 30 minutes to 3 hours.

According to an aspect, the method may further comprise pulverizing the crystallized carbide after the performing of the crystallization process.

According to an aspect, the pulverization process may be performed by at least any one pulverizer selected from the group consisting of a pin mill, a fine impact mill, a ball mill, beads mill, a rotor-mounted airflow type classifier, Dyno mill, a disc mill, a roll mill, and a cyclone.

According to an aspect, the inert gas may include at least any one selected from the group consisting of nitrogen ($N_2$), argon (Ar), helium (He), neon (Ne), krypton (Kr), and xenon (Xe).

According to other embodiment of the present invention, a carbide is provided, wherein the carbide has an average interlayer spacing (d002) of a (002) plane of 3.7 Å to 4.0 Å, which is obtained by an X-ray diffraction method, a crystallite diameter $Lc_{(002)}$ in the C-axis direction of 0.8 nm to 2 nm, an R value of 1.3 to 2, and a peak intensity ratio (5° angle peak/002 peak) of 2° to 4° of an angle.

According to an aspect, the carbide may be manufactured by a method according to an embodiment.

According to an aspect, the carbide may have an average particle size D50 of 10 nm to 50 μm.

According to an aspect, the carbide may have a specific surface area of 50 $m^2/g$ to 500 $m^2/g$ and an average pore size of 1 nm to 2 nm.

According to another embodiment of the present invention, a lithium secondary battery comprising an anode active material including a carbide according to other embodiment is provided, wherein the lithium secondary battery has an irreversible capacity of 200 mAh/g to 600 mAh/g and a capacity retention rate at 50 cycles of 90% or more.

Advantageous Effects

A method for manufacturing a carbide by using bean curd (tofu) or waste bean curd (tofu) according to an embodiment of the present invention can implement higher pore characteristics and electrochemical characteristics by controlling crystallizability of activated carbon, and not only is environmentally friendly, but also can manufacture activated carbon inexpensively by allowing chemicals such as a conventional chemical activation agent not to be used. Further, a method for manufacturing a carbide by using bean curd (tofu) or waste bean curd (tofu) according to an embodiment of the present invention reduces disposal costs by manufacturing a carbide by using bean curd (tofu) discarded as raw material, and can create a new market by resourcing food waste discarded.

A carbide according to an embodiment of the present invention can be usefully used as material for energy storage and environmental purification including an electrode material for a lithium secondary battery and an electrochemical capacitor such as a super capacitor, an electrode material for hydrogen storage, a carbon dioxide storage material, or the like since the carbide can implement pore characteristics higher than those of conventionally commercialized activated carbon, high specific surface area characteristics, and electrochemical characteristics.

A lithium secondary battery comprising an anode active material including a carbide according to an embodiment of the present invention not only can improve battery characteristics such as initial efficiency improvement, lifetime properties, charge and discharge output, low temperature storage properties, etc., but also enables a capacity retention rate at 50 cycles as well as an initial charging/discharging efficiency of the battery to be remarkably improved.

BEST MODE FOR CARRYING OUT THE INVENTION

Hereinafter, embodiments of the present invention will be described in detail with reference to the accompanying drawings. In the description of the present invention, if detailed descriptions of related disclosed art or configuration are determined to unnecessarily make the gist of the present invention obscure, they will be omitted. Also, terms used in the present specification, as terms which are used so as to appropriately describe a preferred embodiment of the present invention, might be differently defined depending on the user's or operator's intention or the practices of the field that the present invention belongs to. Therefore, the terms should be defined based on overall contents of the present specification. The same reference numerals as shown in each drawing represent same elements.

Throughout the present specification, when any member is positioned "on" the other member, this not only includes a case that the any member is brought into contact with the other member, but also includes a case that another member exists between two members.

Throughout the present specification, if a prescribed part "includes" a prescribed element, this means that another element can be further included instead of excluding other elements unless any particularly opposite description exists.

Hereinafter, an electrode active material according to the present invention, a method for manufacturing the electrode active material, and a lithium secondary battery comprising the electrode active material will be described in detail with reference to Examples and drawings. However, the present invention is not limited such Examples and drawings.

According to an embodiment of the present invention, a method for manufacturing a carbide by using bean curd (tofu) or waste bean curd (tofu) is provided, the method comprising: drying bean curd (tofu) or waste bean curd (tofu); thermally treating the dried bean curd (tofu) or waste bean curd (tofu) under an air atmosphere; and carbonizing the thermally treated bean curd (tofu) or waste bean curd (tofu) under an inert gas atmosphere.

Figure 1:
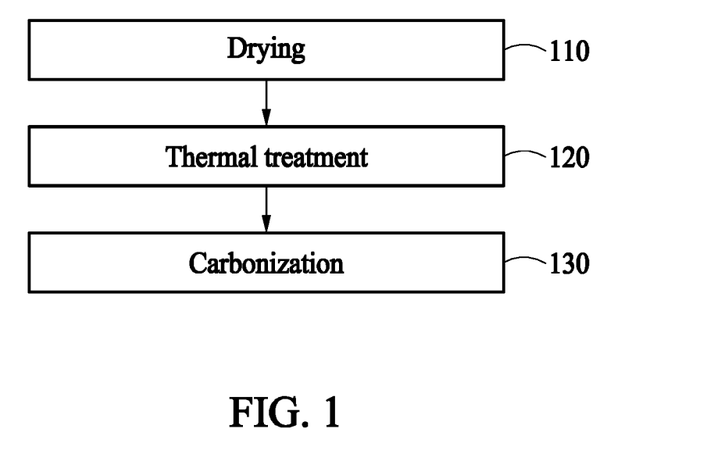
FIG. 1 is a flow chart of explaining a method for manufacturing a carbide by using bean curd (tofu) or waste bean curd (tofu) according to an embodiment of the present invention.

FIG. 1 is a flow chart of explaining a method for manufacturing a carbide by using bean curd (tofu) or waste bean curd (tofu) according to an embodiment of the present invention. Referring to FIG. 1, a method for manufacturing a carbide by using bean curd (tofu) or waste bean curd (tofu) according to an embodiment of the present invention comprises drying step 110, thermal-treatment step 120, and carbonization step 130.

According to an aspect, the drying step 110 may include performing a process of drying bean curd (tofu) or waste bean curd (tofu). Since bean curd (tofu) has a high-water content due to material characteristics, the drying process may be performed to remove water of the bean curd (tofu) or waste bean curd (tofu).

According to an aspect, the drying process may be performed at a temperature of 40° C. to 200° C. for 24 hours to 100 hours. At this time, the bean curd (tofu) or waste bean curd (tofu) may be dried to a residual moisture of less than 10%.

According to an aspect, the drying process may be performed in at least one dryer selected from the group consisting of a hot air dryer, a flash dryer, a cake dryer, and a ring dryer. The dryer may be a device including a chamber and an exhaust port.

According to an aspect, although the drying process may be performed in the hot air dryer by heating hot air to a temperature of 40° C. to 200° C. at a hot air speed of 3 m/sec to 15 m/sec, the present invention is not limited thereto.

According to an aspect, the thermal-treatment step 120 may include performing a process of thermally treating the dried bean curd (tofu) or waste bean curd (tofu) under an air atmosphere.

According to an aspect, the thermal-treatment process may be performed at a temperature range of 200° C. to 500° C. for 30 minutes to 10 hours. A carbon material can be obtained from the bean curd (tofu) or waste bean curd (tofu) by the thermal-treatment process performed in the above-mentioned temperature range for the above-mentioned time range.

According to an aspect, the carbonization step 130 may include performing a process of carbonizing the thermally treated bean curd (tofu) or waste bean curd (tofu) under an inert gas atmosphere.

According to an aspect, the carbonization process may be performed in a high temperature furnace under an inert gas atmosphere. The inert gas may include at least one selected from the group consisting of nitrogen ($N_2$), argon (Ar), helium (He), neon (Ne), krypton (Kr), and xenon (Xe).

According to an aspect, the carbonization process may be performed at a temperature range of 500° C. to 900° C. for 30 minutes to 3 hours. The carbonization process is not perfectly performed when the carbonization process is performed at a temperature of less than 500° C., while the temperature becomes a cause of rising in manufacturing costs due to unnecessary calorific supply, and contamination of a carbide may be generated by a pyrolysate of tar gas discharged from raw material due to a high temperature when the carbonization process is performed at a temperature of more than 900° C.

Figure 2:
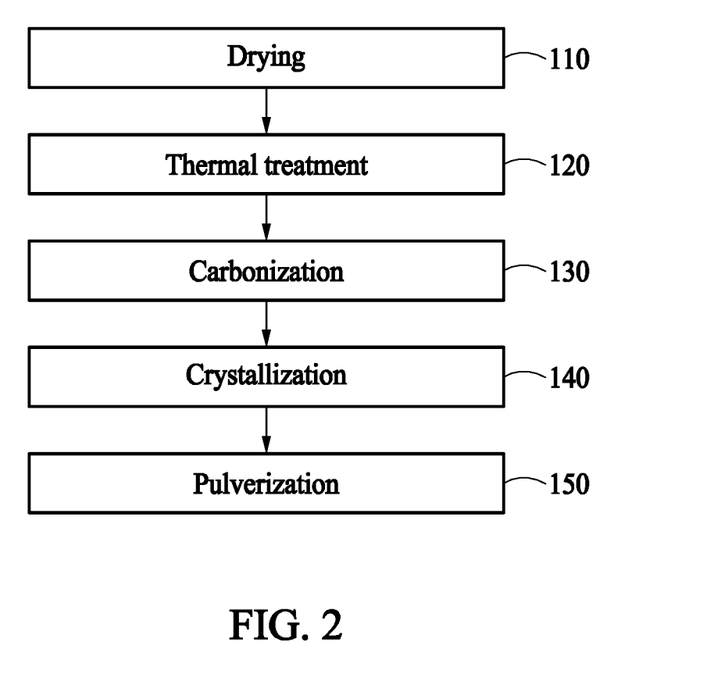
FIG. 2 is a flow chart of explaining a method for manufacturing a carbide by using bean curd (tofu) or waste bean curd (tofu) according to other embodiment of the present invention.

FIG. 2 is a flow chart of explaining a method for manufacturing a carbide by using bean curd (tofu) or waste bean curd (tofu) according to other embodiment of the present invention. Referring to FIG. 2, a method for manufacturing a carbide by using bean curd (tofu) or waste bean curd (tofu) according to other embodiment of the present invention may further comprise crystallization step 140 and pulverization step 150 after performing the drying step 110, the thermal-treatment step 120, and the carbonization step 130 described in FIG. 1.

According to an aspect, the crystallization step 140 may include performing a process of crystallizing the carbonized bean curd (tofu) or waste bean curd (tofu) under an inert gas atmosphere.

According to an aspect, the carbonization process and the crystallization process may be performed at one time, or the crystallization process may be sequentially performed after performing the carbonization process so as to achieve physical properties of a carbide for being used as an anode active material according to an embodiment of the present invention.

According to an aspect, the crystallization process may be performed under an inert gas atmosphere likewise as in the carbonization step. The inert gas may include at least one selected from the group consisting of nitrogen ($N_2$), argon (Ar), helium (He), neon (Ne), krypton (Kr), and xenon (Xe).

According to an aspect, the crystallization process may be performed at a temperature range of 1,000° C. to 1,500° C. for 30 minutes to 3 hours. When the crystallization process is performed at a temperature of less than 1,000° C., an activation reaction is not well performed, and there may be a problem that lowering of battery capacity occurs at about 5 initial cycles as hydrogen remained in carbon is irreversibly reacted with lithium ions when a carbide manufactured later is used as an anode active material for a lithium secondary battery. When the crystallization process is performed at a temperature of more than 1,500° C., yield is lowered due to an excessive activation reaction, energy density is greatly dropped during manufacturing of the battery by reducing reversible capacity, i.e., storage capacity of lithium ions, and irreversible capacity can be increased when the lithium ions are reacted with water in a battery reaction by increasing specific surface area, thereby increasing a property of adsorbing water in the air. Further, there is a problem from a commercial point of view that manufacturing costs and process costs are increased since material and composition of the electric furnace should be changed into material highly resistant to heat such that an electric furnace endures a thermal-treatment temperature of more than 1,500° C.

According to an aspect, the pulverization step 150 may include performing a process of pulverizing the crystallized carbide.

According to an aspect, the pulverization process is a process performed to separate the fused particles into individual particles by relieving a fusion phenomenon between particles of a carbide. The pulverization process is applicable any pulverizers if the pulverizers are general pulverizers. The carbide may be pulverized by using a rotary rotor-type pulverizer, the pulverizer is rotated by a circular rotor rotated by a motor, the rotary rotor has at least two pulverization bars mounted thereon, and a cross-sectional shape of the pulverization bars may be formed by a circular or polygonal pulverizer.

According to an aspect, the pulverization process may be performed by at least one pulverizer selected from the group consisting of a pin mill, a fine impact mill, a ball mill, beads mill, a rotor-mounted airflow type classifier, Dyno mill, a disc mill, a roll mill, and a cyclone.

According to an aspect, the crystallized carbide may be pulverized into particles with a particles size of 10 meshes to 1,500 meshes in accordance with a usage purpose, and the pulverized particles may have an average particle size D50 of 10 nm to 50 μm.

A method for manufacturing a carbide by using bean curd (tofu) or waste bean curd (tofu) according to an embodiment of the present invention can implement higher pore characteristics and electrochemical characteristics by controlling crystallizability of activated carbon, and not only is environmentally friendly, but also can manufacture activated carbon inexpensively by allowing chemicals such as a conventional chemical activation agent not to be used. Further, a method for manufacturing a carbide by using bean curd (tofu) or waste bean curd (tofu) according to an embodiment of the present invention reduces disposal costs by manufacturing a carbide by using bean curd (tofu) discarded as raw material, and can create a new market by resourcing food waste discarded.

According to other embodiment of the present invention, a carbide is provided, wherein the carbide has an average interlayer spacing ($d_{002}$) of a (002) plane of 3.7 Å to 4.0 Å, which is obtained by an X-ray diffraction method, a crystallite diameter $Lc_{(002)}$ in the C-axis direction of 0.8 nm to 2 nm, an R value of 1.3 to 2, and a peak intensity ratio (5° angle peak/002 peak) of 2° to 4° of an angle. Average interlayer spacing ($d_{002}$) analysis of a carbide comprises obtaining a graph of 2θ values measured by using an X-ray diffraction method, obtaining a peak position of the graph by an integration method, and enabling $d_{002}$ ($d002=\lambda/2 \sin \theta$) to be calculated by Bragg equation.

According to an aspect, the carbide may be manufactured by the method according to an embodiment.

According to an aspect, the carbide may have an average particle size D50 of 10 nm to 50 μm. When the carbide has an average particle size D50 of less than 10 nm, there is a problem that irreversible capacity can be increased when the lithium ions are reacted with water in the battery reaction by increasing generation amount of fine powder, thereby increasing a property of adsorbing water in the air, and there may be high temperature storage property-deteriorating problems that packing density of the particles is lowered by increasing porosity between particles according to an increase in the fine powder, and lithium ions inserted into carbon particles are easily eluted at a high temperature of 65° C. or more during the battery reaction. Further, when the carbide has an average particle size D50 of more than 50 μm, there may be a problem that input/output characteristics of the lithium ions are deteriorated during the battery reaction by decreasing an interface between the particles, thereby reducing an entry area of the lithium ions.

According to an aspect, the carbide may have a specific surface area of 50 m²/g to 500 m²/g and an average micropore size of 1 nm to 2 nm. A method for measuring specific surface areas may comprise collecting samples in accordance with KS A 0094 and KS L ISO 18757, performing a degassing treatment process on the collected samples through a pretreatment device at 300° C. for 3 hours, and measuring specific surface areas of the samples in a pressure section (P/P0) of 0.05 to 0.3 by a nitrogen gas adsorption BET method through a pore size analyzer. A method for measuring average pore sizes may comprise performing the degassing treatment process through the pretreatment device at 300° C. for 3 hours, and analyzing pores of sample surfaces by a nitrogen gas adsorption method through a pore size analyzer (Bellsorp mini II).

A carbide according to an embodiment of the present invention can be usefully used as material for energy storage and environmental purification including an electrode material for a lithium secondary battery and an electrochemical capacitor such as a super capacitor, an electrode material for hydrogen storage, a carbon dioxide storage material, or the like since the carbide can implement pore characteristics higher than those of conventionally commercialized activated carbon, and high specific surface area characteristics and electrochemical characteristics.

According to another embodiment of the present invention, a lithium secondary battery comprising an anode active material including a carbide according to other embodiment is provided, wherein the lithium secondary battery has an irreversible capacity of 200 mAh/g to 600 mAh/g and a capacity retention rate at 50 cycles of 90% or more.

A lithium secondary battery comprising an anode active material including a carbide according to an embodiment of the present invention not only can improve battery characteristics such as initial efficiency improvement, lifetime properties, charge and discharge output, low temperature storage properties, etc., but also enables a capacity retention rate at 50 cycles as well as an initial charging/discharging efficiency of the battery to be remarkably improved.

Hereinafter, the present invention will be described in detail with reference to the following Examples and Comparative Examples. However, the technical idea of the present invention is not restricted or limited by the Examples and Comparative Examples.

EXAMPLES

Example 1

Bean curd (tofu) was dried at 80° C. for 3 days to remove water from the bean curd (tofu). Subsequently, the dried bean curd (tofu) was thermally treated at 400° C. for 3 hours. A carbide was manufactured by carbonizing the thermally treated bean curd (tofu) at 800° C. for 2 hours under a nitrogen atmosphere and crystallizing the carbonized bean curd (tofu) at 1,100° C. for 2 hours under the nitrogen atmosphere.

Example 2

A carbide was manufactured under the same condition by the same method as in Example 1 except that the crystallization process was performed at a crystallization temperature of 1,200° C.

Example 3

A carbide was manufactured under the same condition by the same method as in Example 1 except that the crystallization process was performed at a crystallization temperature of 1,300° C.

Example 4

A carbide was manufactured under the same condition by the same method as in Example 1 except that the crystallization process was performed at a crystallization temperature of 1,400° C.

Comparative Example 1

A carbide was manufactured under the same condition by the same method as in Example 1 except that the crystallization process was performed at a crystallization temperature of 800° C.

Comparative Example 2

A carbide was manufactured under the same condition by the same method as in Example 1 except that the crystallization process was performed at a crystallization temperature of 2,500° C.

Comparative Example 3

A commercial carbide was prepared.

Figure 3:
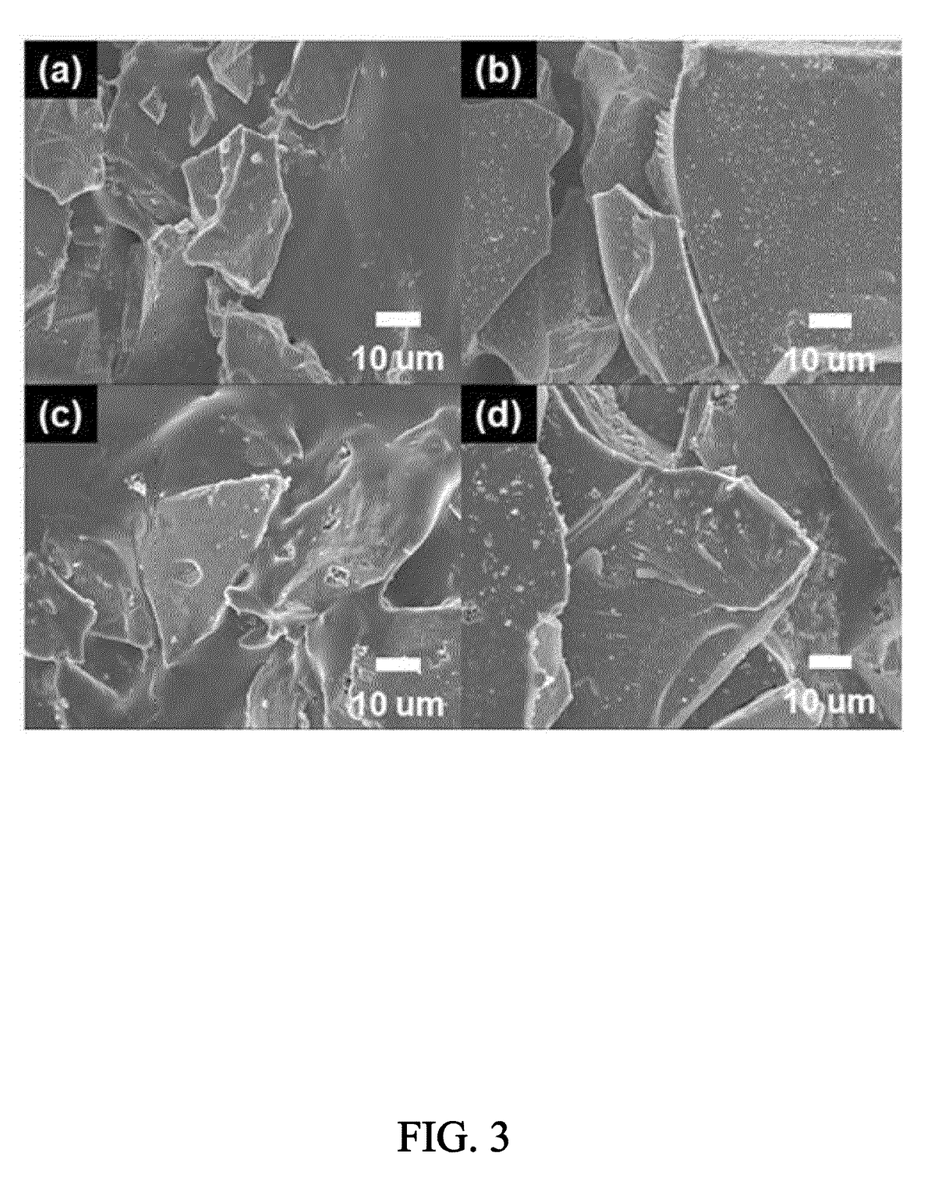
FIG. 3 is scanning electron microscope (SEM) photographs of measuring surfaces of carbides in Examples 1 to 4 of the present invention ((a) Example 1, (b) Example 2, (c) Example 3, and (d) Example 4).

FIG. 3 is scanning electron microscope (SEM) photographs of measuring surfaces of carbides in Examples 1 to 4 of the present invention ((a) Example 1, (b) Example 2, (c) Example 3, and (d) Example 4). Referring to FIG. 3, it can be confirmed that fine pores are formed. A reason for the formation of pores is that more gas is exhausted by an activation reaction due to the crystallization process. Electrochemical characteristics of a lithium secondary battery can be further improved later by enabling the fine pores to improve specific surface area value, and improving an electrically activated region between an electrode and an electrolyte as a fine pore structure is formed.

Figure 4:
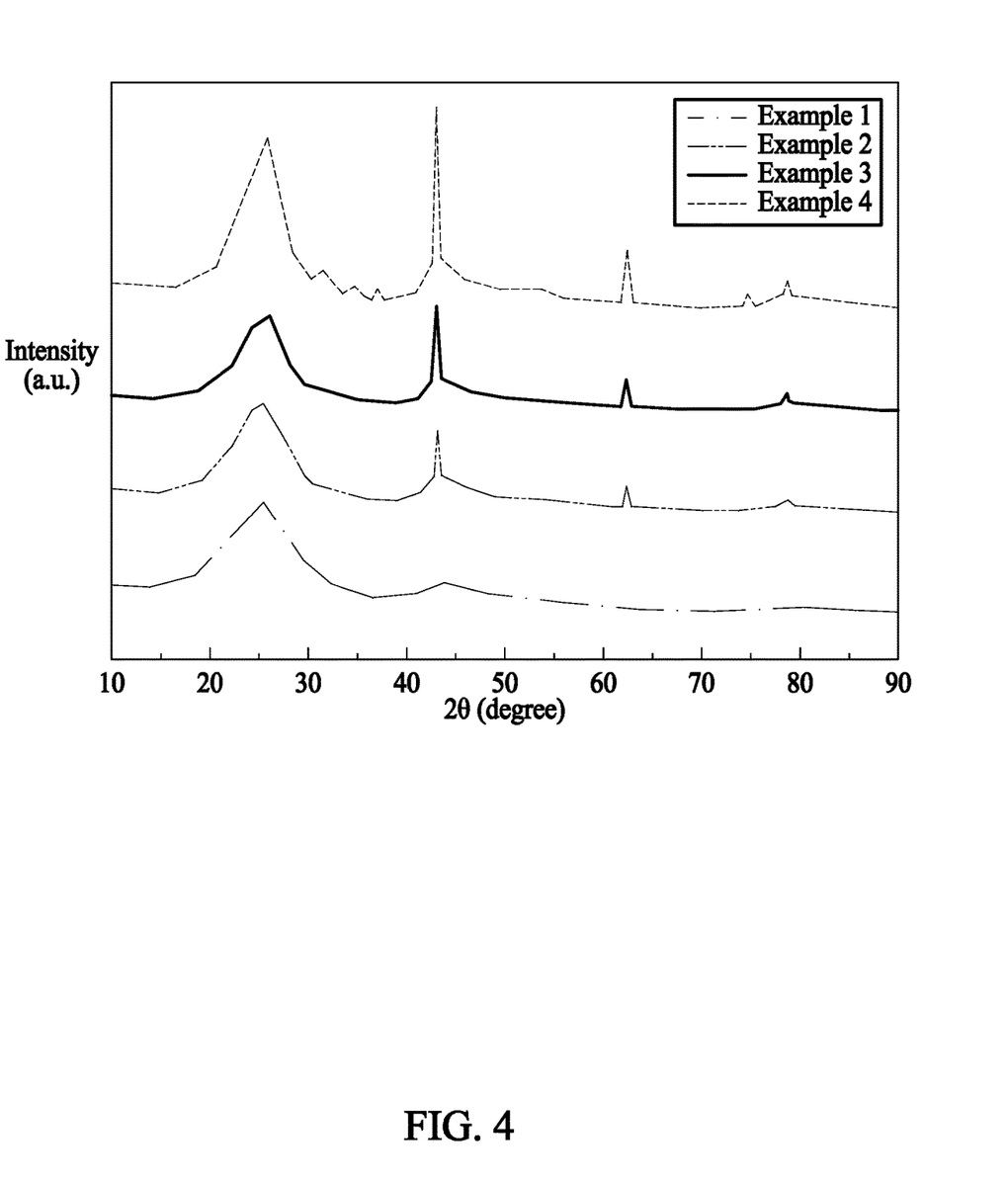
FIG. 4 is X-ray diffraction (XRD) data in Examples 1 to 4 of the present invention.

FIG. 4 is X-ray diffraction (XRD) data in Examples 1 to 4 of the present invention. Referring to FIG. 4, there is not a phase change in the carbides of Examples 1 to 4. It can be expected that there is no carbide degradation. When the carbides are degraded, electrochemical characteristics may be lowered. However, the carbides manufactured by Examples 1 to 4 of the present invention may exhibit excellent electrochemical characteristics.

[Experimental Example] Manufacturing Lithium Secondary Batteries

Electrode Manufacturing

After adding 2.0 parts by weight of polyvinylidene fluoride (PVdF) and 1.0 part by weight of carbon black (Ketjen black) to 7.0 parts by weight of anode active materials, i.e., the carbides as anodes of Examples 1 to 4 and Comparative Examples 1 to 3, additionally adding an N-methyl-2-pyrrolidone (NMP) solvent to the anode active materials, and uniformly stirring the materials and anode active materials into slurry type mixtures, the slurry type mixtures were uniformly coated on copper foils. The coating process was uniformly performed to a thickness of 20 μm by using a doctor blade, the slurry type mixtures uniformly coated to a thickness of 20 μm on the copper foils were dried in a 100° C. oven for 12 hours, and a pressing process was performed on the dried slurry type mixtures coated on the copper foils to obtain electrodes on the foils. The electrodes on the foils were punched into circular electrodes on the foils having an area of 1 cm².

Manufacturing Test Cells

The anode active materials of Examples 1 to 4 and Comparative Examples 1 to 3 were used in anodes of non-aqueous electrolyte secondary batteries. Lithium secondary batteries were constructed by using lithium metal as the opposite poles, and characteristics of the lithium secondary batteries were evaluated so as to independently accurately evaluate the charging (lithium intercalation) capacity and discharging (lithium deintercalation) capacity of the anode active materials in a state that charging (lithium intercalation) capacity and discharging (lithium deintercalation) capacity of the anode active materials are not affected by performance of opposite poles.

The lithium secondary batteries as coin-type cells with 2,032 size (20.0 mm of diameter and 3.2 mm of thickness) were assembled within a glove box under an argon atmosphere, metal lithium with thickness of 1 mm was pressed onto the bottom of coin-type cell cans, a separation membrane made of polypropylene was formed on the metal lithium pressed onto the coin-type cell cans, thereby allowing the anodes to face lithium. At this time, an electrolyte used was prepared by mixing ethylene carbonate (EC) with dimethyl carbonate (DMC) at a volume ratio of 1:1 to prepare a solvent, and adding 1.0 M $LiPF_6$ salt to the solvent, and the lithium secondary batteries were assembled by injecting the electrolyte into the coin-type cells, closing a can cover of the coin-type cells having the electrolyte injected thereinto, and pressing can cover-closed coin-type cells.

Measuring Battery Capacity Values

Charging and discharging processes were performed at 25° C. by using a battery cycler system (WonATech Corp., WMPG 3000) to analyze characteristics for the assembled lithium secondary batteries. Here, the 'charging process', as a reaction in which lithium is intercalated into the anodes, is a reaction in which voltages of the coin-type cells are lowered. The 'discharging process', as a reaction in which lithium is deintercalated from the anodes and moved towards the opposite poles, is a reaction in which the voltages of the coin-type cells rise. Further, charging and discharging conditions include performing the charging and discharging processes up to 100 cycles at a predetermined current density of 100 $mAg^{-1}$ until the voltages of the coin-type cells became 0.005 V to 3.0 V.

Measuring High-Rate Charging and Discharging Properties

Analysis operations of high-rate charging and discharging properties for the assembled lithium secondary batteries were conducted at 25° C. by performing the charging and discharging processes in the same manner as in (c). After changing current density values during charging and discharging, thereby increasing predetermined current density values supplied or discharged for each cycle (100 $mAg^{-1}$, 300 $mAg^{-1}$, 500 $mAg^{-1}$, 700 $mAg^{-1}$, 1,000 $mAg^{-1}$, 2,000 $mAg^{-1}$, and 100 $mAg^{-1}$), the high-rate charging and discharging properties were indicated as capacities (mAh/g) which had been charged/discharged and measured from the current density values.

Figure 5:
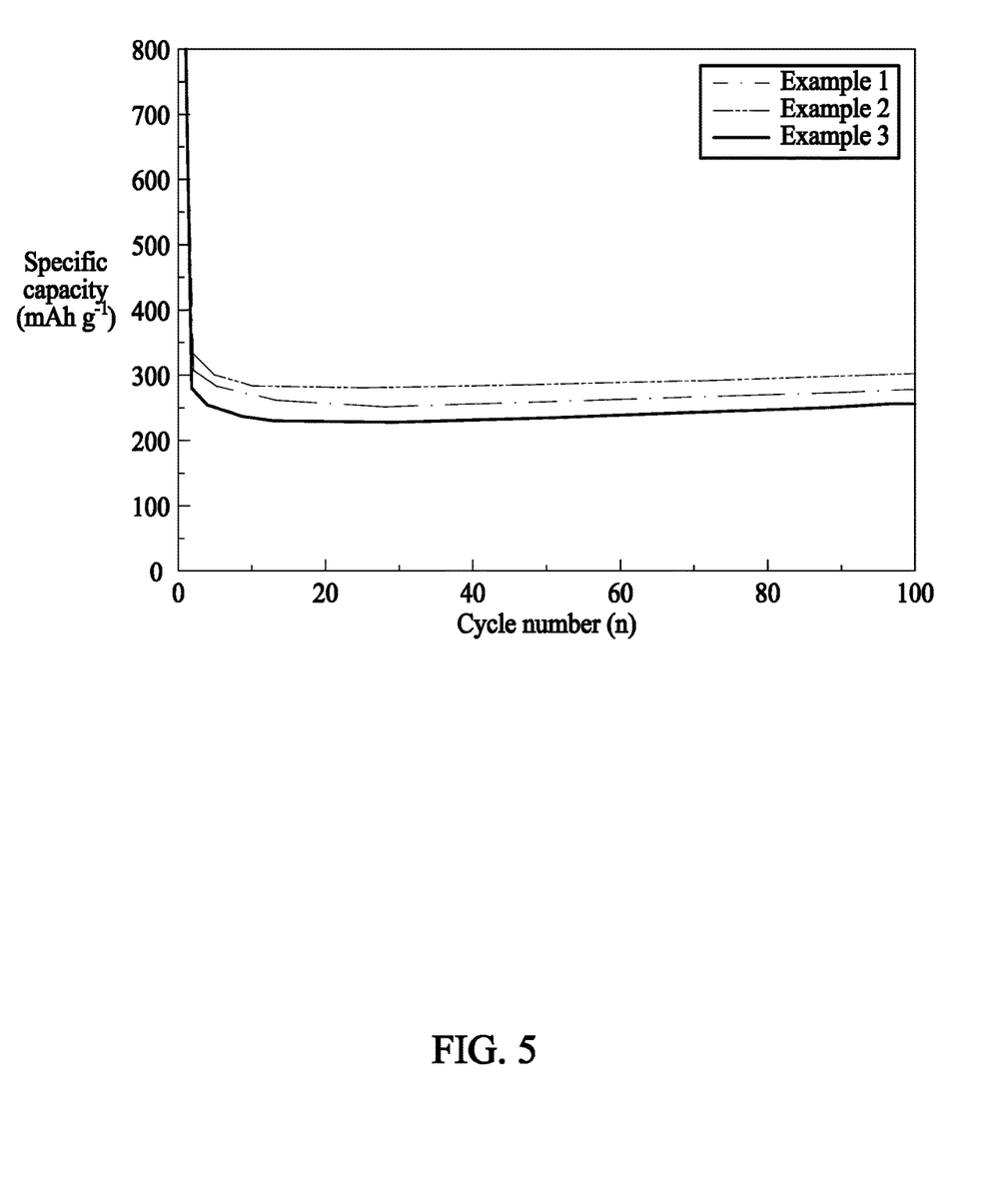
FIG. 5 is a drawing showing cycling stability values in Examples 1 to 3 of the present invention.

FIG. 5 is a drawing showing cycling stability values in Examples 1 to 3 of the present invention. The cycling stability values of all samples are excellent since all samples are made of carbon material such that intercalation and deintercalation of lithium ions are reversibly performed. However, Example 1 particularly shows high capacity and outstanding cycling stability. It can be seen that the high capacity and outstanding cycling stability are shown since a crystallization temperature of Example 1 is the most appropriate temperature such that a crystallization process of carbon is well performed.

Figure 6:
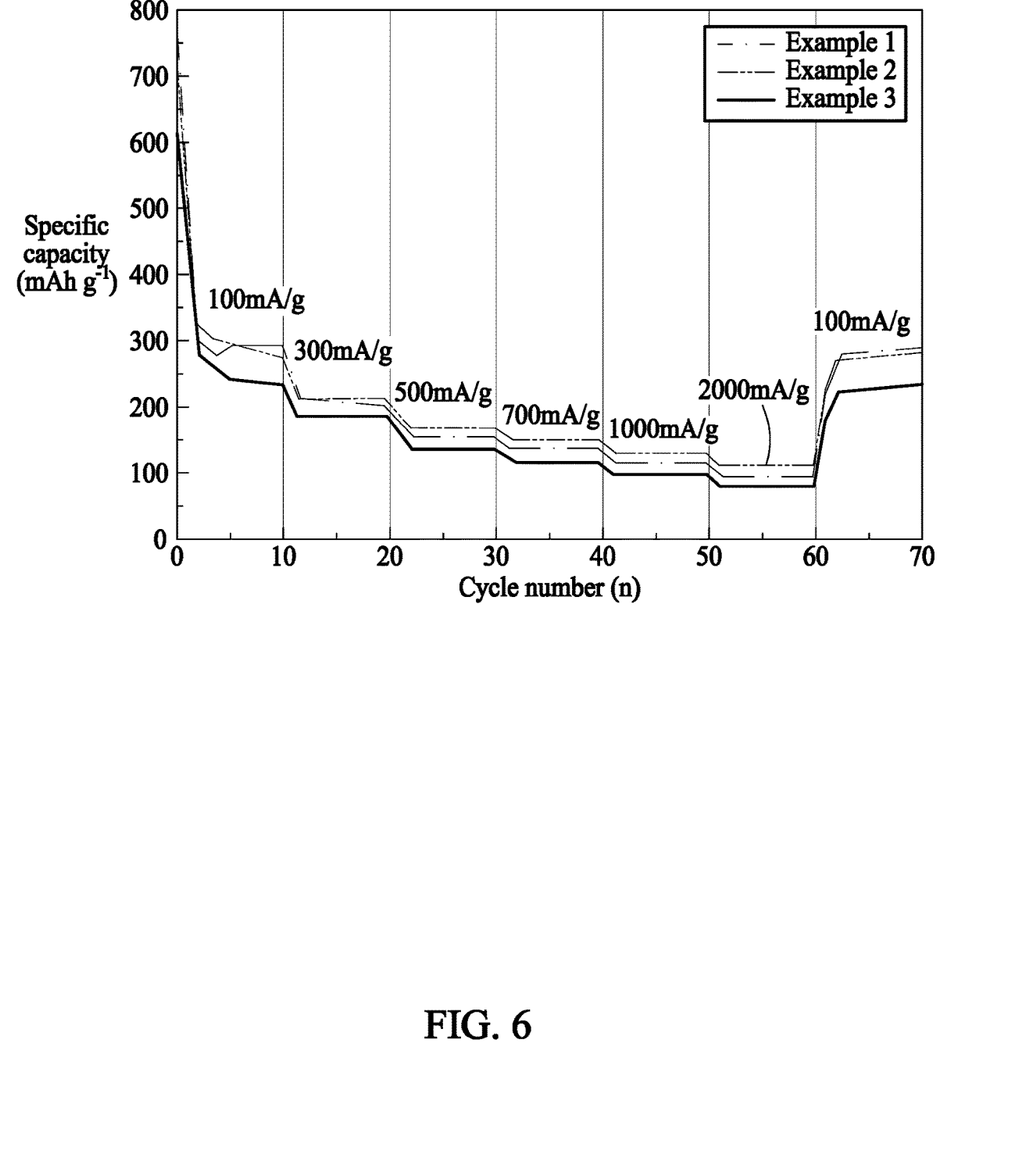
FIG. 6 is a drawing showing cycling stability values in Examples 1 to 3 of the present invention.

FIG. 6 is a drawing showing stability values according to current density values in Examples 1 to 3 of the present invention. The all samples show stability at high current density values since all samples are made of carbon material such that intercalation and deintercalation of lithium ions are reversibly performed at high current density values. However, it can be seen that Example 1 particularly shows high capacity and stability. It can be seen that intercalation and deintercalation of lithium ions are stably generated even at high current density values since a crystallization temperature of Example 1 is the most appropriate temperature such that a crystallization process of carbon is well performed.

Although the present invention has been described by limited embodiments and drawing as described above, the present invention is not limited to the embodiments, and those skilled in the art to which the present invention pertains enable various modifications and changes to be made from such descriptions. Therefore, the scope of the present invention should not be limited to and defined by described embodiments, but should be defined by equivalents of the patent claims as well as patent claims described later.

The invention claimed is:

1. A method for manufacturing a carbide using bean curd (tofu) or waste bean curd (tofu), the method comprising:
   drying bean curd (tofu) or waste bean curd (tofu);
   thermally treating the dried bean curd (tofu) or waste bean curd (tofu) under an air atmosphere; and
   carbonizing the thermally treated bean curd (tofu) or waste bean curd (tofu) under an inert gas atmosphere.
2. The method of claim 1, wherein a drying process is performed at a temperature of 40° C. to 200° C. for 24 hours to 100 hours.

3. The method of claim 1, wherein a drying process is performed in at least any one dryer selected from the group consisting of a hot air dryer, a flash dryer, a cake dryer, and a ring dryer.

4. The method of claim 1, wherein a thermal treatment process is performed at a temperature of 200° C. to 500° C. for 30 minutes to 10 hours.

5. The method of claim 1, wherein a carbonization process is performed at a temperature of 500° C. to 900° C. for 30 minutes to 3 hours.

6. The method of claim 1, wherein the method further comprises crystallizing a carbonized bean curd (tofu) or waste bean curd (tofu) under an inert gas atmosphere after the performing of a carbonization process.

7. The method of claim 6, wherein a crystallization process is performed at a temperature of 1,000° C. to 1,500° C. for 30 minutes to 3 hours.

8. The method of claim 6, wherein the method further comprises pulverizing a crystallized carbide after the performing of a crystallization process.

9. The method of claim 8, wherein a pulverization process is performed by at least one pulverizer selected from the group consisting of a pin mill, a fine impact mill, a ball mill, beads mill, a rotor-mounted airflow type classifier, Dyno mill, a disc mill, a roll mill, and a cyclone.

10. The method of claim 1, wherein the inert gas includes at least any one selected from the group consisting of nitrogen ($N_2$), argon (Ar), helium (He), neon (Ne), krypton (Kr), and xenon (Xe).

11. A carbide being manufactured by the method of claim 1, having an average interlayer spacing (d002) of a (002) plane of 3.7 Å to 4.0 Å, which is obtained by an X-ray diffraction method, a crystallite diameter $Lc_{(002)}$ in the C-axis direction of 0.8 nm to 2 nm, an R value of 1.3 to 2, and a peak intensity ratio (5° angle peak/002 peak) of 2° to 4° of an angle.

12. The carbide of claim 11, wherein the carbide has an average particle size D50 of 10 nm to 50 μm.

13. The carbide of claim 11, wherein the carbide has a specific surface area of 50 $m^2$/g to 500 $m^2$/g and an average pore size of 1 nm to 2 nm.

14. A lithium secondary battery comprising an anode active material including the carbide of claim 11, wherein the lithium secondary battery has an irreversible capacity of 200 mAh/g to 600 mAh/g and a capacity retention rate at 50 cycles of 90% or more.

\* \* \* \* \*